US011100205B2

(12) United States Patent
Burri et al.

(10) Patent No.: US 11,100,205 B2
(45) Date of Patent: Aug. 24, 2021

(54) SECURE AUTOMATED TELLER MACHINE (ATM) AND METHOD THEREOF

(71) Applicant: JPMorgan Chase Bank, N.A., New York, NY (US)

(72) Inventors: Nikhil Mallikarjun Reddy Burri, Secaucus, NJ (US); Ram Nagpure, Monmouth Junction, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 294 days.

(21) Appl. No.: 16/189,083

(22) Filed: Nov. 13, 2018

(65) Prior Publication Data

US 2019/0147156 A1  May 16, 2019

Related U.S. Application Data

(60) Provisional application No. 62/585,350, filed on Nov. 13, 2017.

(51) Int. Cl.
| | |
|---|---|
| *H04L 29/06* | (2006.01) |
| *G06F 21/32* | (2013.01) |
| *G07F 19/00* | (2006.01) |
| *G06K 9/00* | (2006.01) |
| *G10L 17/00* | (2013.01) |
| *G10L 25/63* | (2013.01) |

(52) U.S. Cl.
CPC ......... *G06F 21/32* (2013.01); *G06K 9/00255* (2013.01); *G07F 19/206* (2013.01); *G07F 19/207* (2013.01); *G10L 17/00* (2013.01); *G10L 25/63* (2013.01)

(58) Field of Classification Search
CPC .......... H04L 63/0861; H04L 2463/083; G06F 21/32
See application file for complete search history.

(56) References Cited

U.S. PATENT DOCUMENTS

| | | | |
|---|---|---|---|
| 8,988,186 B1 * | 3/2015 | Dent ................. | G06Q 20/1085 340/5.32 |
| 2009/0189983 A1 * | 7/2009 | Brumfield ........ | G08B 13/19613 348/159 |
| 2014/0067679 A1 * | 3/2014 | O'Reilly .......... | G06Q 20/40145 705/44 |
| 2015/0123766 A1 * | 5/2015 | St. John ................. | G07C 9/257 340/5.84 |

(Continued)

FOREIGN PATENT DOCUMENTS

JP  20050165503  *  6/2005  ............. G07D 13/00

*Primary Examiner* — Jason K Gee
(74) *Attorney, Agent, or Firm* — Greenblum & Bernstein, P.L.C.

(57) ABSTRACT

A system for authenticating a user at an automated teller machine (ATM) includes an ATM and a server. The ATM captures a facial image of the user in response to a request to conduct an ATM transaction. The ATM further analyzes the captured facial image and transmit facial image data to the server. The server, upon receiving the facial image data, compares the received facial image data with reference facial image data for similarity. If the server determines that a level of similarity between the facial image data corresponding to the captured facial image and the stored reference facial image data is at or above predetermined threshold, the ATM authenticates the user and dispense cash to the user.

20 Claims, 8 Drawing Sheets

(56) References Cited

U.S. PATENT DOCUMENTS

| | | | | |
|---|---|---|---|---|
| 2015/0317511 A1* | 11/2015 | Li | ................... | G06K 9/00268 |
| | | | | 382/118 |
| 2015/0358790 A1* | 12/2015 | Nasserbakht | ......... | G06F 16/128 |
| | | | | 455/414.1 |
| 2017/0223017 A1* | 8/2017 | Kohli | ................... | H04L 63/18 |
| 2018/0137335 A1* | 5/2018 | Kim | ................ | G06K 9/00604 |

* cited by examiner

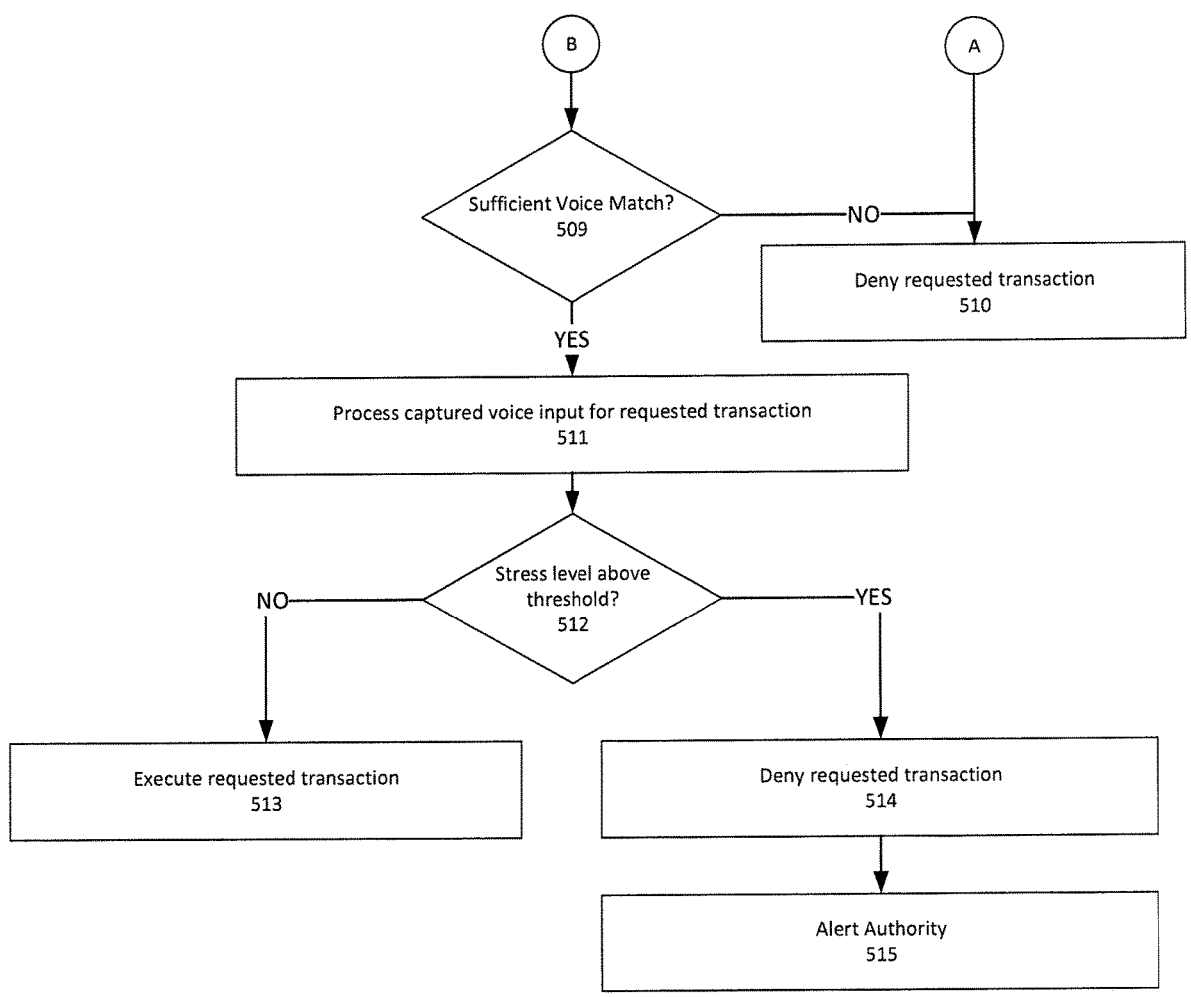

SECURE AUTOMATED TELLER MACHINE (ATM) AND METHOD THEREOF

CROSS-REFERENCE TO RELATED APPLICATION(S)

The present application claims the benefit of U.S. Provisional Patent Application No. 62/585,350 filed on Nov. 13, 2017. The entire disclosure of the above-identified application, including the specifications, drawings and/or claims, is incorporated herein by reference in its entirety.

BACKGROUND

1. Field of the Disclosure

The present disclosure relates to the field of automated teller machines. More particularly, the present disclosure relates to security surrounding use of automated teller machines.

2. Background Information

Automatic teller machines (ATMs) provide convenient access to consumers as they are accessible at any time or day. ATMs typically require a debit card associated with a consumer's account and a personal identification (PIN) code or number associated with the respective debit card. The PIN code may include a combination of 4 digits, which provide some level of security. However, in view of advancement in technology, thieves may be able obtain such PIN codes through various devices, such as blocking devices, skimming devices, fake PIN pads and the like. Further, PIN codes may be obtained via phishing scams. In view of insufficient security measures surrounding ATM technology, millions of dollars may be drawn from the ATMs without consent of the cardholder.

Additionally, over time, use of physical ATM cards may not provide requisite level of security in accessing one's account, and cardholders may feel burdened in having to carry a physical ATM cards in a society that is moving away from use of physical wallets and contents stored therein. Further, cardholders at times will forget to bring the physical ATM card with them blocking access to their accounts and causing an inconvenience.

BRIEF DESCRIPTION OF THE DRAWINGS

FIGS. 5A and 5B show an exemplary method for authenticating a user using biometric data, according to an aspect of the present disclosure;

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
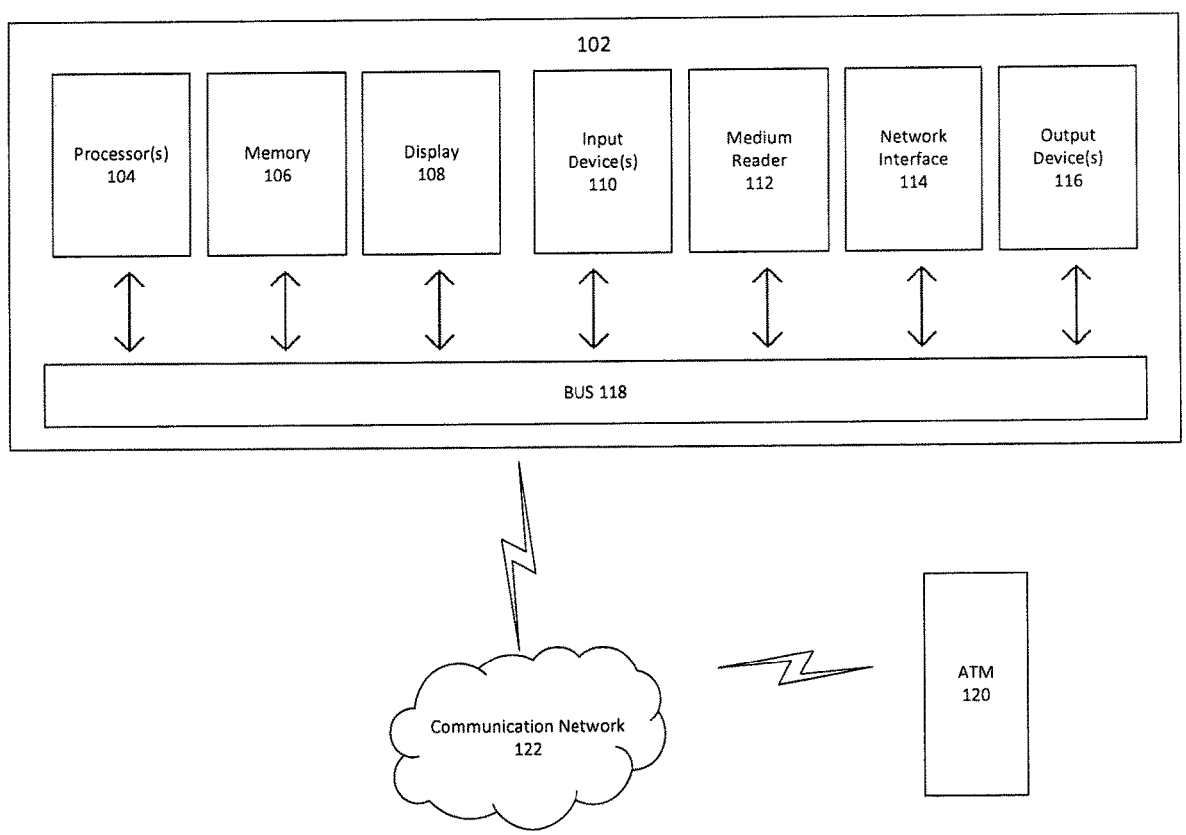
FIG. 1 shows an exemplary general computer system that includes a set of instructions for providing a secure automated teller machine.

FIG. 1 is an illustrative embodiment of a general computer system, on which a method for providing a secure automated teller machine (ATM) can be implemented, and which is shown and is designated 100. The computer system 100 includes a computer 102 and an automated teller machine 120 connected to a communication network 122. Each of the computer 102 and the automated teller machine 120 can include a set of instructions that can be executed to cause the computer system 100 to perform any one or more of the methods or computer based functions disclosed herein. Each of the computer 102 and the automated teller machine 120 may operate as a standalone device or may be connected, for example, using a network 122, to other computer systems or peripheral devices. Further, one or more of the computer 102 and the automated teller machine 120 may connect or communicate with other computer systems by near field communications, which includes, without limitation, near field communication (NFC), Bluetooth, radio frequency identification (RFID), or other communication technologies that allow direct communication with another computer system or device.

In a networked deployment, the computer 102 may operate in the capacity of a server, a client user computer, or any computing device having at least a processor and a memory in a server-client user network environment, or as a peer computer system in a peer-to-peer (or distributed) network environment. The computer system 100 may operate in a network environment including an intermediary device for facilitating transactions with other computer systems, or in a peer-to-peer network environment without the intermediary device. The intermediary device may be a remote third party server residing on a network or a third party device that is not directly involved in a transaction between two computer systems or devices.

The automated teller machine 120 may also communicate with other computing devices, having similar configuration as the computer 102. The computing devices can also be implemented as or incorporated into various devices, such as a stationary computing device, a mobile computer, a wearable computer (e.g., smart watch), a computer system in a vehicle, a personal computer (PC), a laptop computer, a tablet computer, a wireless smart phone, a personal digital assistant (PDA), a communications device, a control system, a network router, switch or bridge, or any other machine capable of executing a set of instructions (sequential or otherwise) that specify actions to be taken by that machine.

The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer 102 includes one or more processors 104. The one or more processors 104 include instruction that may be executed. A processor 104 for a computer 102 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor 104 is an article of manufacture and/or a machine component. A processor 104 for a computer 102 is configured to execute software instructions in order to perform functions as described in the various embodiments herein. A processor 104 for a computer 102 may be a general purpose processor or may be part of an application specific integrated circuit (ASIC). A processor 104 for a computer 102 may also be a microprocessor, a microcomputer, a processor chip, a controller, a microcontroller, a digital signal processor (DSP), a state machine, or a programmable logic device. A processor 104 for a computer 102 may also be a logical circuit, including a programmable gate array (PGA) such as a field programmable gate array (FPGA), or another type of circuit that includes discrete gate and/or transistor logic. A processor 104 for a computer 102 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer 102 includes a memory 106, which may store a software program and/or instructions to be executed by the one or more processors 104. The memory 106 may communicate with the one or more processors 104 via a bus 118. Further, the computer 102 may access external memory via a network, such as a cloud network. The memory 106 of the computer 102 may include an open source biometric data store, a deep neural network (DNN) face detection module, an iris image segmentation processing layer, a voice modulation processing layer, a user biometric data store with a user face image store, a user iris image store, and a user voice image store, a DNN face recognizer module, a DNN voice recognizer module, face recognition weights store, an iris codes store, and a voice recognition weights store, although the memory can include other policies, modules, databases, or applications, for example.

Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory (e.g., secure digital (SD) non-volatile memory card), electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

As shown, the computer 102 may further include (or may be connected to) one or more output device(s) 116. The one or more output device(s) 116 may include, without limitation, a speaker, a signal generator, a remote control and the like. The computer 102 may also include or be connected to a display 108. The display may include a liquid crystal display (LCD), an organic light emitting diode (OLED), a flat panel display, a solid state display, a touch display interface, or a cathode ray tube (CRT). Additionally, the computer 102 may include an input device 110, such as a keyboard/virtual keyboard or touch-sensitive input screen or speech input with speech recognition, and a cursor control device, such as a mouse or touch-sensitive input screen or pad. Further, the input device 110 may additionally include a biometric input device, which may capture biometric information of a user. The biometric input device may include, without limitation, a finger print reader, a camera, an iris scanner, a microphone, and any other device that may capture biometric information of the user. The computer 102 can also include a medium reader 112 and a network interface 114.

In a particular embodiment, as depicted in FIG. 1, the medium reader 112 may include a computer-readable medium in which one or more sets of instructions, e.g. software program may be embedded. Sets of instructions stored in the medium reader 112 can be read from the computer-readable medium that is to be read by the medium reader 112. Further, the instructions stored in the medium reader 112, when executed by a processor, can be used to perform one or more of the methods and processes as described herein. In a particular embodiment, the instructions related to the medium reader 112 may reside completely, or at least partially, within the memory 106, and/or within the processor 104 during execution by the computer 102.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium to be read by the medium reader may include instructions or receives and executes instructions responsive to a propagated signal; so that a device connected to the communication network 122 can communicate voice, video or data over the communication network 122. Further, the instructions may be transmitted or received over the communication network 122 via the network interface 114.

Figure 2:
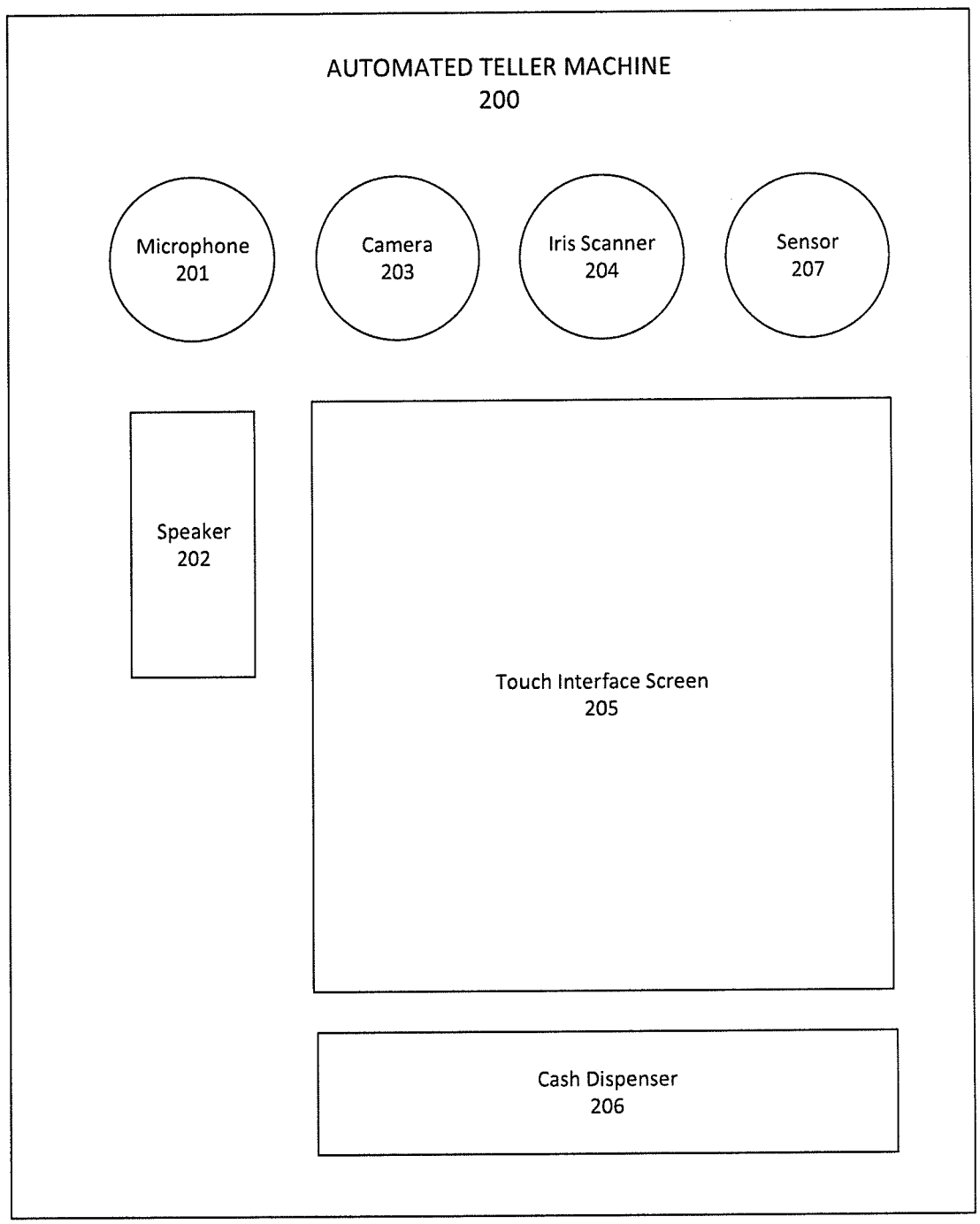
FIG. 2 shows an exemplary automated teller machine, according to an aspect of the present disclosure.

FIG. 2 shows an exemplary automated teller machine (ATM), according to an aspect of the present disclosure.

As illustrated in FIG. 2, ATM 200 includes a microphone 201, a speaker 202, camera 203, an iris scanner 204, a touch interface screen 205, a cash dispenser 206 and a sensor 207.

The microphone 201 may be configured to acquire a voice input of a consumer or user of a bank associated with the ATM 200. The microphone 201 may continuously be on, switched between an on and off state until receiving a voice input, or may be triggered to acquire the voice input in response to a trigger signal. For example, the trigger signal may include a movement detected by a sensor 207, or may be a touch input detected by the touch interface screen 205. However, aspects of the present disclosure are not limited thereto, such that the trigger signal may include a signal transmitted by a mobile device of the consumer.

The acquired voice input of the consumer may be compared with a stored reference voice or reference voice code of the consumer for authenticating the consumer. The reference voice or voice code of the consumer may be provided at a physical location after authenticating the consumer's identity. For example, the reference voice may be obtained as part of opening a bank account, or may be provided via a separate process. Alternatively, the reference voice may be provided remotely via a computing device having a microphone functionality. For example, a consumer may upload his or her voice after remotely authenticating the consumer's account. Upon providing of the voice input, the voice input may be analyzed or processed to identify acoustic characteristics of the consumer's voice. Further, the consumer or user may be requested to provide the voice input in a neutral tone for detecting deviations therefrom to identify certain emotions of levels of stress.

Further, the microphone 201 may be also measure stress level of the consumer. For example, the microphone 201 may recognize certain vocal characteristics as an indication of stress or fear. The vocal characteristics may include pitch, intensity levels and the like. If the microphone 201 detects that a stress level that is above a reference threshold, the ATM may prevent further operations and/or alert relevant authority.

The speaker 202 may output a sound signal in response to an input by the consumer or based on a detected trigger. For example, the speaker 202 may provide voice instructions in response to detecting a movement near the ATM or receiving an input signal at the ATM. Further, consumers with certain vision impairment may opt to interact in voice, rather than in response to visual prompts. Also, in a non-limiting aspect of the present disclosure, if the camera 204 and/or microphone 201 detects that the consumer is distressed and/or is accompanied by other persons when the consumer is accessing the ATM, a sound alarm may be triggered and outputted to the speaker to bring attention to the consumer.

The camera 203 may be configured to capture a video image or a still image. The camera 203 may acquire an image of the consumer requesting access to a bank account or funds for verifying identity of the consumer. The camera 203 may acquire an entire face of the consumer or select facial features of the consumer. In an example, upon acquiring of a facial image of the consumer or user, the facial image of the may be mapped. More specifically, pixel coordinates may be mapped with a facial feature or a land mark of the facial image. Features of the face may include eyes centers, inside corner of eyes, outside corner of eyes, width of eyes, width of mouth, width of the nose, depth of eye sockets, shape of cheekbones, length of jaw line, distance between eyes to nose and the like. Further, the mapped facial features may be extracted and stored as a facial print of a particular consumer or user.

The acquired facial image or corresponding image data of the consumer may be checked against reference images of faces or facial features stored in a database. More specifically, coordinates of various features of a face of a consumer may be stored as a face print and checked against stored reference facial image data or face prints of consumers (e.g., coordinates of various features from the reference stored image data). Further, other structural features of the face may additionally be extracted and checked against stored reference facial image data, which may include dimensions of a face (e.g., height and weight), color of the face, facial hair, and the like.

Further, the camera 203 may be also recognize a facial expression of the consumer. For example, the camera 203 may recognize certain facial expression as an indication of stress or fear. More specifically, the captured facial image or extracted image data may be compared with the reference facial image data of the respective facial image data of the consumer or user. The reference facial image data may be one of a neutral expression. Based on comparison of some of the feature points, such as the eyes or the mouth, of the captured facial image with the reference facial image data, a facial expression of the consumer may be determined.

The camera 203 may also detect a distance from the consumer from other persons within a reference proximity or range from the consumer. In an example, the camera 203 may detect whether another person is standing too close to the consumer as the consumer is conducting a transaction at the ATM. If the camera 203 detects that another person is within a predetermined distance from the consumer or too close to the consumer, along with a facial expression indicative of fear or stress, the camera 203 may record an image of the instance and alert relevant authorities.

A reference facial image of the consumer for performing authentication may be initially acquired at a physical location after authenticating the consumer's identity. For example, the reference facial image may be obtained as part of opening a bank account, or may be provided via a separate process. Alternatively, the reference facial image may be provided remotely via a computing device having a camera functionality. For example, a consumer may upload his or her facial image to be used as the reference facial image after remotely authenticating the consumer's account. Further, the reference facial image may be provided with a validity period, which may prompt the consumer to provide an updated reference facial image at predetermined intervals (e.g., after 2 years). For example, when a match is determined to be above a predetermined threshold (e.g., 99%) between the facial image captured by the camera 203 against the stored reference facial image, the facial image captured by the camera 203 may be uploaded to a server to be used as an updated reference facial image.

Quality of the camera 203 may be varied based on security requirements. For example, the camera 203 may be configured to capture a detailed image of an iris of the consumer for performing an iris scan for performing additional verification of the consumer's identity. Alternatively, the camera 203 may be configured to capture a facial image of lower resolution to reduce data size to be transmitted to a server. Further, quality of the facial image to be captured may be adjusted according to a requested transaction. For example, if the transaction requested by the consumer is for depositing of a check, the quality of the camera 203 may be configured to be lower for reducing a data size. In contrast, if the transaction requested by the consumer is to withdraw daily max limit, the quality of the camera 203 may be configured to be higher to provide for higher security. However, aspects of the present disclosure are not limited thereto, such that the iris scan may be performed by a separate iris scanner.

Iris scanner 204 may be configured to perform an iris scan of the consumer. The Iris scan may be performed along with, prior to, or subsequent to capturing of an image of the consumer by the camera 203. However, aspects of the present disclosure are not limited thereto, such that the iris scan may be performed by the camera 203 instead of the iris scanner 204. Further, iris scanner 204 may be configured to perform the iris scan if higher quality scan is determined to be necessary after an initial scan is performed by the camera 203. In an example, the iris scanner 204 may identify a mathematical pattern of the iris of the consumer, and compare the identified mathematical pattern with a stored mathematical pattern for identifying the consumer.

The touch interface screen 205 may provide a display screen, and also a touch capacitive input device. In an example, a touch capacitive layer may be overlaid over a display layer to provide for both a display operation and an input operation. An input may be received via a touch on the touch interface screen 205. However, aspects of the present disclosure are not limited thereto, such that the touch interface screen 205 may be implemented by having a separate display area and an input device area.

The cash dispenser 206 is configured to dispense requested cash amount based on a request by the consumer, upon authentication of the consumer based on biometric information of the consumer. The biometric information may include, without limitation, an image of a face, a voice, an iris scan, a finger print scan and the like.

The sensor 207 may be a motion sensor that detects a motion of a person. The sensor 207 may further trigger a signal in response to a detection of a motion. The signal may trigger the microphone 201 to acquire sound within a vicinity. Further, the signal may also trigger the camera 203 to wake and capture an image. The signal may also trigger lights to be switched on based on a time of day. Further, the sensor 207 may be an infrared sensor that detects body heat of a person, which may potentially indicate a sign of stress or fear.

Figure 3:
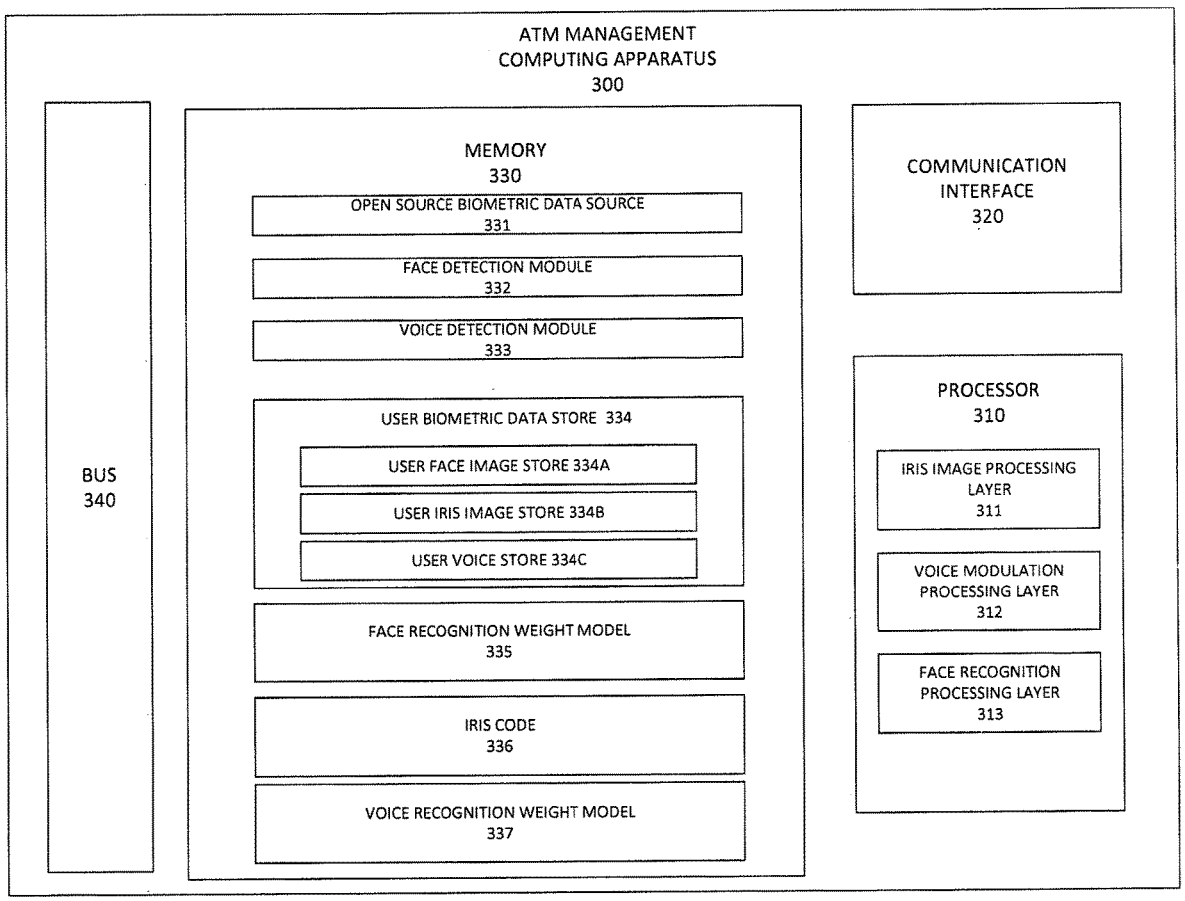
FIG. 3 shows an exemplary configuration of an automated teller machine, according to an aspect of the present disclosure.

FIG. 3 shows an exemplary configuration of an automated teller machine management computing apparatus, according to an aspect of the present disclosure.

As illustrated in FIG. 3, an automated teller machine (ATM) management computing apparatus 300 includes a processor 310, a communication interface 320, a memory 330 and a bus 340. The processor 310, the communication interface 320 and the memory 330 may receive and transmit information via the bus 340.

The processor 310 includes an iris image processing layer 311, a voice modulation processing layer 312, and a face recognition processing layer 313. Although three layers are illustrated as being included in the processor 310, aspects of the present disclosure are not limited thereto, such that the processor 310 may include more or less layers.

The iris image processing layer 311, for example, may be configured to train to detect an iris in an image and generate corresponding weights which can be used to identify an iris in another analyzed image.

The voice modulation processing layer 312, for example, may be configured to train to detect a voice in audio and generate corresponding weights which can be used to identify a voice in other analyzed audio.

The face recognition processing layer 313, for example, may be configured to process a facial image captured at an automated teller machine for identification of a consumer corresponding to the facial image. The face recognition processing layer 313 may identify an area of the captured image corresponding to a face, and provide a mapping of the face captured in the image. Based on the mapped face, pixel coordinates corresponding to a facial feature or a land mark of the facial image may be identified. Features of the face may include eyes centers, inside corner of eyes, outside corner of eyes, width of eyes, width of mouth, width of the nose, depth of eye sockets, shape of cheekbones, length of jaw line, distance between eyes to nose and the like. Based on the mapping of various feature points of the face included in the captured image, a face print of the consumer may be identified.

The face recognition processing layer 313 may further compare the acquired facial image or corresponding image data of the consumer against reference images of faces or facial features stored in a database. More specifically, coordinates of various features of a face of a consumer may be stored as a face print and checked against stored reference facial image data or face prints of consumers (e.g., coordinates of various features from the reference stored image data). Further, other structural features of the face may additionally be extracted and checked against stored reference facial image data, which may include dimensions of a face (e.g., height and weight), color of the face, facial hair, and the like. The face recognition processing layer 313 may determine that the face of the captured image of the consumer sufficiently correspond with the stored reference facial image data if a determined level of similarity is at or above a predetermined threshold. If the level of similarity is determined to be at or above the predetermined threshold, then the face recognition processing layer 313 determines that the consumer in the captured facial image is the correct consumer requesting the transaction at the ATM.

The communication interface 320 may include one or more network components, which may connect through various networks for performing communication with another computing device. For example, the communication interface 320 may perform short range communication, a wired network communication, a wireless network communication, and telephonic communication. Further, the communication interface 320 may communicate with a cloud network. The communication interface 320 may also communicate with various device contemporaneously for performing a transaction. The near field communication may include Bluetooth communication, near field communication, radio frequency communication and the like.

The memory 330 includes an open source biometric data store 331, a face detection module 332, a voice detection module 333, a user biometric data store 334, a face recognition weight model 335, an iris code store 336, and a voice recognition weight model 337.

The open source biometric data store 331 may include, without limitation, biometric data stored by a governmental agency or other organization, which allow outside access. Biometric data may include, without limitation, facial images, finger print data, voice data, blood type and the like. In an example, the open source biometric data store may obtain, store, and provide open source or other facial images which can be used to train for facial recognition.

The user biometric data store 334 with the user face image store 334A, the user iris image store 334B, and the user voice image store 334C may, for example, be configured to store face images, iris images and voices for registered customers of an entity for use in facial, iris, and voice recognition, although other types and/or amounts of biometric data of customers may be stored. The user biometric data store 334 may be an open source biometric data store may, for example, be configured to obtain, store, and provide open source or other facial images which can be used to train for facial recognition.

The face detection module 332 may include facial detection algorithm, which may be executed to measure various features of a captured facial image of the user or consumer. The face detection module 332 may analyze structural features provided on a captured image and take measurements based on the structural features. For example, the face detection module 332 may differentiate between facial and non-facial regions, as well as features points and non-feature points of a face. Feature points may include, without limitation, eyes, nose, mouth, cheek bones, chin, forehead, dimensions between feature points and the like. In addition, a pattern of the detected feature points may be utilized in identifying a facial image.

Various techniques may be utilized for detecting faces, which may include Open CV, Python, Neural Networks, Matlab and the like. Face detection may be performed on a captured image or may be performed in real-time. Further, additional analysis may be performed to detect a facial expression of the recognized facial image to identify signs of particular emotions or stress level. The face detection module 332 may be a deep neural network (DNN) face detection module. The DNN face detection module may be configured to use a DNN to train to detect a face in an image and generate corresponding weights which can be used to identify a face in another analyzed image. The DNN face detection module may be configured to identify a face in a captured image of a customer at an ATM and compare that identified face against the facial images in the user face image store for correspondence.

The voice detection module 333 may include voice detection algorithm, which may be executed to recognize an identity of a speaker using voice biometrics, which may include, without limitation, acoustic pattern of a person, voice pitch, and speaking style. Various technologies may be used to process a voice print, such as neural networks, frequency estimation, hidden Markov models, Gaussian mixture models, pattern matching algorithms, matrix representation, Vector Quantization and the like. In an example, the voice detection module 333 may be a deep neural network (DNN) voice detection module. The DNN voice detection module, for example, may be configured to compare a voice in a captured audio of a customer at an ATM or other location against the stored voices in the user voice store for correspondence.

The user biometric data store 334 includes user face image store 334A, user iris image store 334B, and user voice store 334C. The user face image store 334A may store a facial image of a user, a facial pattern of the user, and/or date of the image.

The user face image store 334A may store a reference facial image or facial pattern of the user. The user face image store 334A may allow the facial image of the user to be updated with a new image if the new image is determined to be of a certain confidence level. For example, if the stored facial image of the user is more than two years old and newly captured image is determined to be an accurate facial image of the user, the newly capture image may replace the stored facial image. The user iris image store 334B may store a reference iris image or iris pattern of the user, which may be utilized to authenticate or identify a user. The user voice store 334C may store a reference voice print or an acoustic pattern of the users, which may be utilized to authenticate or identify the user. Further, the user voice store 334C may additionally store a speaking style of the user for identifying emotional state or stress level of the user.

Face recognition weight model 335 may store a weight modeling algorithm, which may place particular weight to a specific feature point or points of a facial image. In an example, the face recognition weight model 335 may be static or may be adjusted according to circumstances. For example, a default model may place certain amount of weight to a relationship between eyes, nose, and mouth. If a face has a particularly distinguishing feature, such as an unusual distance between the eyes, more weight may be provided to such a feature. Further, if an obstruction (e.g., scarf) covers a mouth of the user, more weight may be placed on the eyes and the nose. In an example, the face recognition weight model 335 may be configured to store the identified and updated weights for facial recognition in a captured image at an ATM or any other location.

Iris code store 336 may include a pattern of an iris structure of various users. The iris includes a number of layers and contains blood vessels, pigment cells and iris muscles. Based on an image of an iris, various features may be extracted by converting the image to a set of mathematical parameters. Based on the conversion, identifying features, such as stripes, freckles, and corneas may be extracted and coded to generate an iris code. In an example, iris codes of various users may be stored for comparison. The iris code store 336 may, for example, be configured to store the identified and updated weights for iris recognition in a captured image at an ATM or other location.

Voice recognition weight model 337 may store a weight modeling algorithm, which may place particular weight to a specific acoustic feature point or points of a user's voice. In an example, the voice recognition weight model 337 may also detect a particular emotional state or stress level of a user based on acoustic attributes of a collected voice sample of the user. For example, pitch and intensity may be analyzed for levels of stress or emotion. The voice recognition weight model 337 may, for example, be configured to store the identified and updated weights for voice recognition in captured audio at an ATM or other location.

Figure 4:
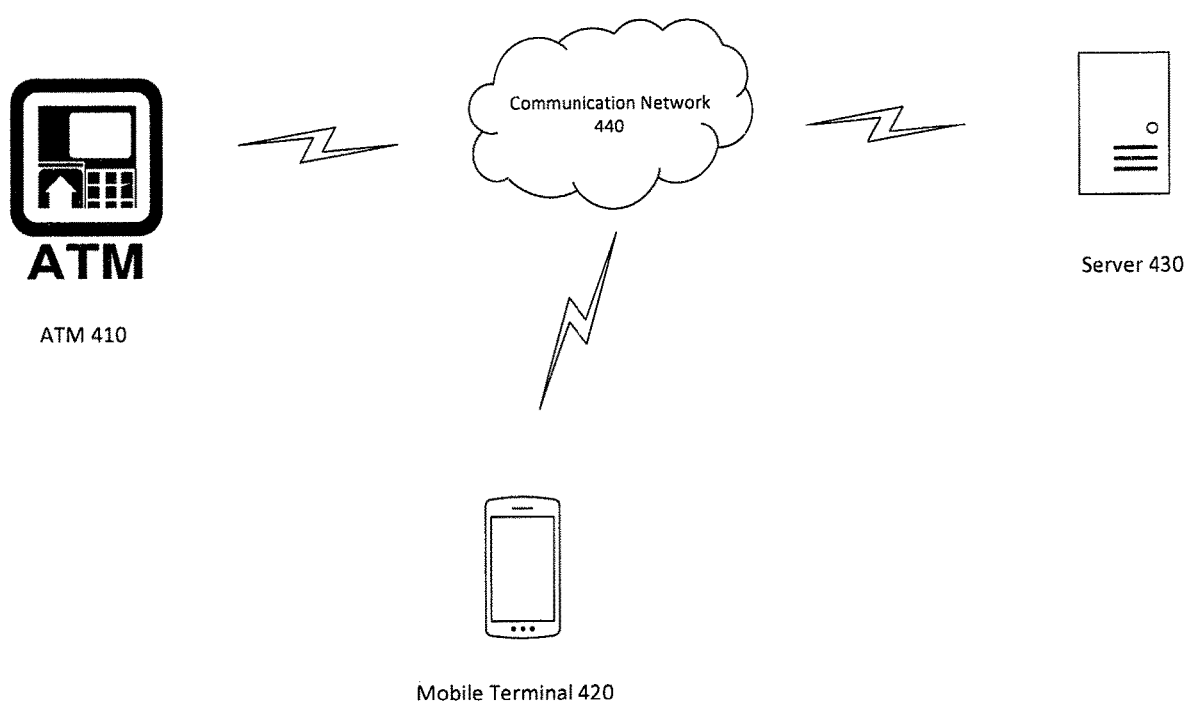
FIG. 4 shows an exemplary network configuration for identity authentication, according to an aspect of the present disclosure.

FIG. 4 shows an exemplary network configuration for identity authentication, according to an aspect of the present disclosure.

As illustrated in FIG. 4, an automated teller machine (ATM) 410, a mobile terminal 420 and a server 430 are connected to a communication network 440.

In an example, the ATM 410 may have a configuration similar to those illustrated in FIG. 2. The ATM 410 may include a camera and a microphone for capturing of user biometric information. The user biometric information may include a facial image, a voice sample of the user, an iris scan image, a finger print, and the like. The facial image may be two-dimensional or three-dimensional. The ATM 410 may collect multiple biometric information in a sequence or contemporaneously. Further, various biometric information may be continuously collected during a transaction or may be collected at discrete points during a transaction. For example, voice of the user may be continuously collected to detect for signs of stress or unusual emotion, such as fear.

The captured biometric information may be sent, from a communication interface of the ATM 410, to the server 430 via the communication network 440 as a batch file after their collection, or may be intermittently transmitted in real-time as biometric information is captured for authenticating a user accessing the ATM 410.

In a non-limiting example, the communication interface of the ATM 410 operatively couples and communicates between the ATM 410 and other corresponding devices or servers, although other types and/or numbers of communication networks or systems with other types and/or numbers of connections and/or configurations to other devices and/or elements can also be used.

The mobile terminal 420 may include at least a processor, a memory, a transmitter and a receiver. The mobile terminal 420 may additionally include a camera, a microphone, a finger print reader, and the like. The mobile terminal 420 may be a smart phone, a smart watch, a tablet, a laptop or the like. However, aspects of the present disclosure is not limited thereto, such that the mobile terminal 420 may include a stationary computer or a kiosk. In an example, the mobile terminal 420 may capture an image of a user and upload the captured image to the server 430 as a reference image. The mobile terminal 420 may allow uploading of the captured image via the mobile terminal 420 after the user has successfully authenticated his or her identity. In an example, the user may authenticate his or her identity via one or more of a finger print scan on the mobile terminal 420, via a closed-system face detection (e.g., user's facial image is the only image on file for authentication), via a closed-system voice recognition (e.g., user's voice is the only voice on file for authentication), an account password, an account personal identification number (PIN), and the like.

The server 430 may include at least a processor, a memory, a transmitter and a receiver. Although a single server is illustrated in FIG. 4, aspects of the present disclosure is noted limited thereto, such that the server 430 may represent a network of servers residing on a cloud network. In an example, the server 430 may be a closed-network server that may be accessible only by members of a particular organization. In another example, the server 430 may be an open-network server, such as a government database, that may be accessible by various members of the public. Further, the server 430 may serve as a repository of biometric information for various users to upload into for later authentication.

The server 430 may receive a facial image from the ATM 410 for comparison with the reference facial image data stored at the server 430. If the server 430 determines that the facial features of the received facial image matches with the stored reference facial image data within a reference threshold value, the server 430 may authenticate the user as being a valid user. The reference threshold value may be a universal value for all types of transaction, or may be adjusted in accordance with a type of transaction being requested to be performed. For example, if the user is requesting to make a deposit, a lower threshold may be required to be met. Alternatively, if a request to withdraw a large sum of funds is made, such as a set daily maximum, a higher threshold may be required to be met prior to approving such a request. Further, certain transaction may require authentication of multiple biometric information (e.g., facial detection and iris scan) and/or account information (e.g., personal identification number, security question, password or etc.)

The communication network 440 may include a wired network or a wireless network. Further, the communication network 440 may employ any suitable interface mechanisms and network communication technologies. In non-limiting aspects of the present disclosure, the communication network 440 can include local area network(s) (LAN(s)) or wide area network(s) (WAN(s)), and can use TCP/IP over Ethernet and industry-standard protocols, although other types and/or numbers of protocols and/or communication networks can be used. The communication network 440 may employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

Figure 5A:
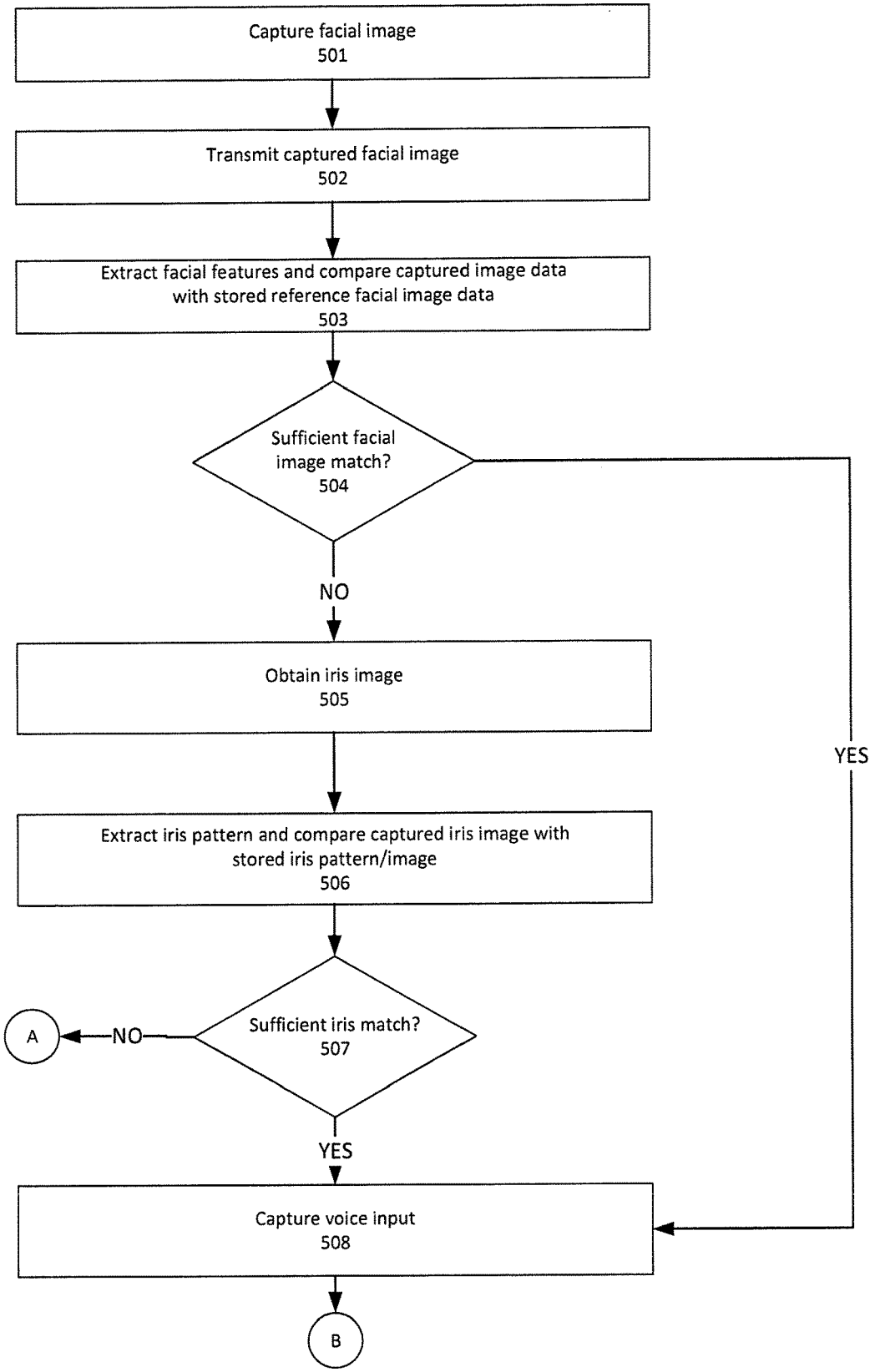

FIGS. 5A and 5B show an exemplary method for authenticating a user using biometric data, according to an aspect of the present disclosure.

In operation 501, an image of a user is captured via a camera provided on an automated teller machine (ATM). In an example, the camera may capture a two-dimensional image of a user's face in response to a user's request to conduct a transaction. In a non-limiting aspect, biometric information capturing components of the ATM may be activated upon detecting a presence of a user at the ATM. The presence of the user may be detected by a motion sensor provided at the ATM. Further, the camera capture an image of the user in response to the detected presence or in response to a voice request to conduct an ATM transaction. The ATM transaction may, for example, include, without limitation, checking of a balance, requesting withdrawal of cash, making a deposit, and the like.

In operation 502, the captured facial image of the user is transmitted to an automated teller machine (ATM) management computing apparatus, which may be a server, for comparison with a reference image stored in the server. The server may reside in a cloud network. For example, the reference image may be captured when the user first opened an account with the respective institution and may be provided by the institution itself. Alternatively, the reference image may be captured independently and uploaded remotely by a terminal of the user. For example, a user utilizing an application of the institution may verify his or her account via one or more of a user name, password, finger print, personal identification number (PIN), security question and the like, and then capture a facial image to upload as a reference facial image. The reference facial image may be analyzed and processed to extract specific facial features, which may be saved as reference facial image data for comparison with the facial image captured by the ATM. Facial features may include, without limitation, relative measurements of the eyes, nose, mouth, cheek bones, chin, forehead, dimensions between feature points and the like of the user. In addition, a pattern of the detected facial feature points may be utilized in identifying a facial image.

In operation 503, facial features of the captured image are extracted, and the extracted facial features are then compared with the reference facial image to authenticate the user. In an example, structural features of the captured image may be extracted for comparison, such as facial and non-facial regions, as well as various features points of a face. More specifically, measurements may be taken based on the structural features. Measurements, may for example, include dimensions of eyes, nose, mouth and relative distance to one another. Based on such measurements and/or detection of features points, various techniques may be utilized for comparing the captured image with the reference facial image for authentication of a user. The various techniques for detection of faces may include, without limitation, Open CV, Python, Neural Networks and the like.

In an example, the ATM management computing apparatus may use facial recognition weights obtain from a face recognition weight model to determine a percentage correspondence of the captured facial image with stored reference facial image data in the user image store. Further, the DNN face detection module executed by the ATM management computing apparatus may process images obtained from an open source biometric data store to determine the facial recognition weights. However, aspects are not limited thereto, such that other methods for performing facial recognition may be implemented.

In operation 504, a determination of whether a sufficient match has been made is rendered. For example, if a comparison result determines that a similarity between facial features of the captured image and the reference image has a match rate equal to or greater than a predetermined threshold, then a sufficient match is determined to have been made and the method proceeds to operation 508 for capturing of a voice input. If the comparison result determines that the similarity between the facial features of the captured image and the reference image has a match rather lower than the predetermined threshold, then insufficient match is determined to have been made and the method proceeds to operation 505 for further authentication.

In an example, the predetermined rate may be a percentage rate and may be adjusted according to a requested transaction. In other words, various predetermined rates may be set for different transactions and/or amounts. For example, for making a deposit or requesting a balance inquiry, the predetermined threshold may be adjusted to be lower. Contrastingly, if the requested transaction is to withdraw an amount of money that is greater than a specific amount, then the predetermined threshold may be adjusted to be higher. Further, if the requested sum to be withdrawn is the daily maximum limit, then the predetermined threshold may be set to a high level. However, aspects of the present disclosure are not limited thereto, such that the predetermined rates may be adjusted according to various factors, such as previous transactions, length of account, frequency of transactions and the like. Alternatively, however, for certain transactions, additional biometric authentication may be performed as a matter of course.

In operation 505, an image of the user's iris is obtained. For example, the image of the iris may be additionally captured using an iris scanner or may be extracted from the captured facial image based on the quality of the facial image captured.

In operation 506, an iris pattern may be extracted from the image of the user's iris and compared with a reference iris image of the user for authentication. The iris includes a number of layers and contains blood vessels, pigment cells and iris muscles. Based on an image of an iris, various features may be extracted by converting the image to a set of mathematical parameters. Based on the conversion, identifying features, such as stripes, freckles, and corneas may be extracted and coded to generate an iris code.

In operation 507, a determination of whether a sufficient match has been made is rendered. For example, if a comparison result determines that a similarity between iris pattern or code of the user captured in the iris image and the reference image has a match rate equal to or greater than a predetermined threshold, then a sufficient match is determined to have been made and the method proceeds to operation 508 for capturing of a voice input. If the comparison result determines that the similarity between the iris pattern or code of the captured iris image and the reference image has a match rather lower than the predetermined threshold, then insufficient match is determined to have been made and the method proceeds to operation 510 to deny the requested transaction.

In an example, the predetermined rate may be a percentage rate and may be adjusted according to a requested transaction. For example, for making a deposit, the predetermined threshold may be adjusted to be lower. Contrastingly, if the requested transaction is to withdraw an amount of money that is greater than a specific amount, then the predetermined threshold may be adjusted to be higher. Further, if the requested sum to be withdrawn is the daily maximum limit, then the predetermined threshold may be set to a high level. Alternatively, however, for certain transactions, additional biometric authentication may be performed as a matter of course.

In operation 508, voice data of the user is captured. In an example, the voice data of the user may be captured when a user provides a voice command to the ATM. Further, the ATM may request the user to speak a particular phrase or simply speak into the microphone to capture a voice data of the user. Although the voice data is illustrated as being captured after needing additional authentication, aspects of the present disclosure are not limited thereto, such that the voice data may be captured during an initial voice command or input to the ATM. Further, although the voice data may be initially captured, voice biometrics may be extracted when additional authentication is requested. The voice biometrics may include, without limitation, acoustic pattern of a person, voice pitch, and speaking style. In addition, voice input may be captured and/or analyzed at various points during the ATM transaction.

In operation 509, a determination of whether a sufficient match has been made is rendered. For example, if a comparison result determines that a similarity between the captured voice data and the reference voice code has a match rate equal to or greater than a predetermined threshold, then a sufficient match is determined to have been made and the method proceeds to operation 511 for processing the requested transaction. If the comparison result determines that the similarity between the captured voice data and the reference voice code has a match rather lower than the predetermined threshold, then insufficient match is determined to have been made and the method proceeds to operation 510 for denying the requested transaction.

In operation 511, the voice data is analyzed or processed for determining a stress level of the user. In an example, the captured voice data may analyzed to determine certain voice characteristics as an indication of stress or fear. For example, the vocal characteristics may include pitch, intensity levels and the like.

In operation 512, a determination of a stress level detected from the captured voice data is compared with respect to a predetermined threshold. If the stress level is determined to be less than the predetermined threshold, the requested ATM transaction is executed in operation 513. If the stress level is determined to be above or equal to the predetermined threshold, the method proceeds to operation 514 for denying the requested transaction.

Although the denial of requested transaction is disclosed as being based on the stress level detected in the voice data of the user, aspects of the present disclosure are not limited thereto, such that other data may be considered in the denial of the transaction. For example, even if the stress level detected is below the predetermined threshold, but a camera of the ATM detects another individual is standing in a very close proximity of the user, the ATM may deny the requested transaction. Alternatively, if the stress level detected in the voice data is below the predetermined threshold, additional biometric information may be collected to determine a stress level of the user. For example, an infrared sensor may be used to detected a body heat level of the user.

Further to denying the requested transaction in operation 514, relevant authorities may be alerted in operation 515.

Figure 6:
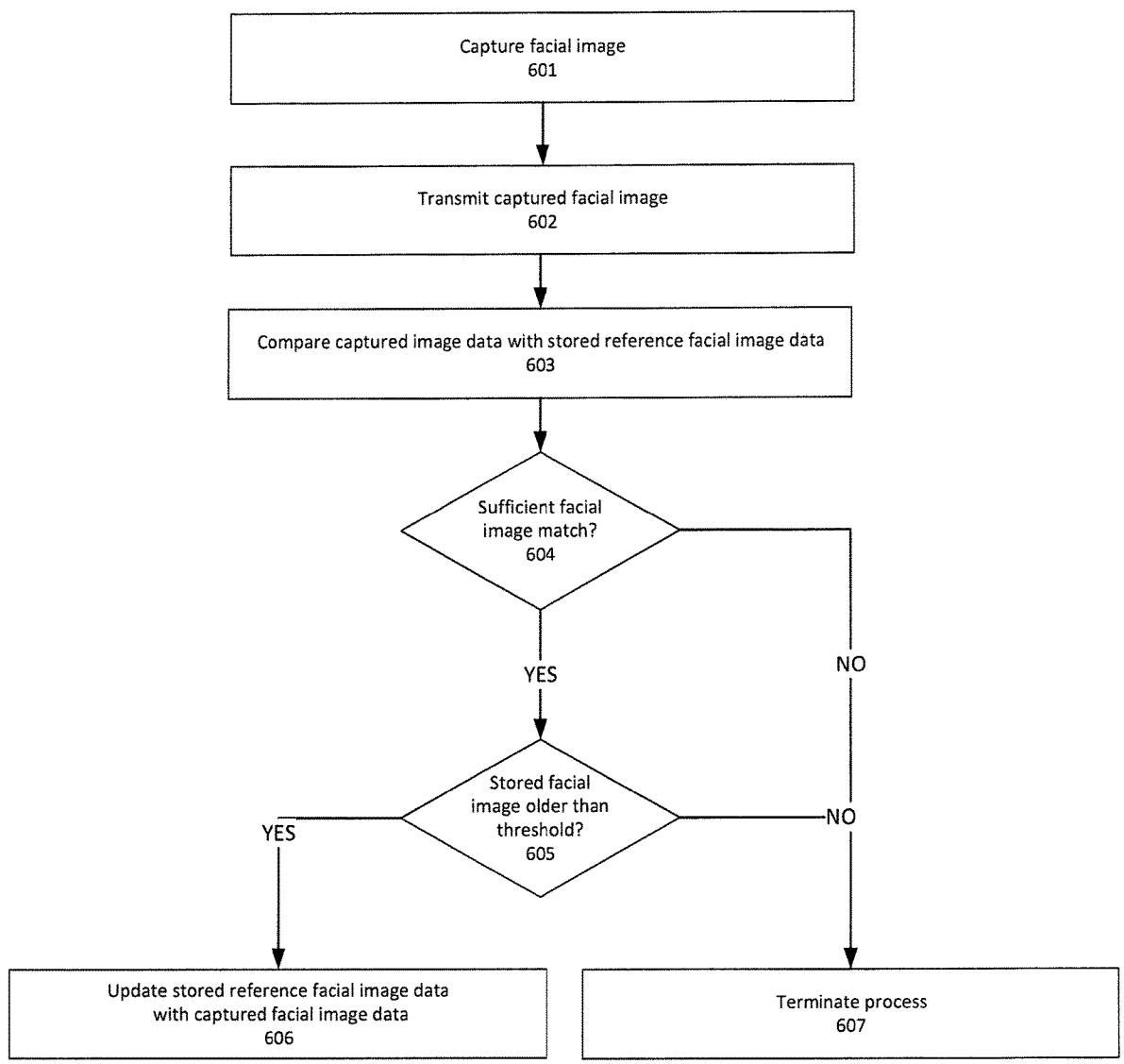
FIG. 6 shows an exemplary method for updating user biometric data, according to an aspect of the present disclosure.

FIG. 6 shows an exemplary method for updating user biometric data, according to an aspect of the present disclosure.

In operation 601, a facial image of a user is captured by a camera of the automated teller machine (ATM). In an example, the camera may be active in response to a request for conducting a transaction. The request may be submitted by a voice request or a by a key input on the ATM. The camera may capture a still image or a video image.

In operation 602, the captured image of the user is transmitted to a server via a communication network. In an example, the communication network may include a wired network or a wireless network. Further, the communication network may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network may be a cloud network to limit access to the server receiving the captured facial images to a particular organization.

In operation 603, facial features of the captured image are extracted, and the extracted facial features are then compared with the reference facial image to authenticate the user. In an example, structural features of the captured image may be extracted for comparison, such as facial and non-facial regions, as well as various features points of a face. More specifically, measurements may be taken based on the structural features. Measurements, may for example, include dimensions of eyes, nose, mouth and relative distance to one another. Based on such measurements and/or detection of features points, various techniques may be utilized for comparing the captured image with the reference facial image for authentication of a user. The various techniques for detection of faces may include, without limitation, Open CV, Python, Neural Networks and the like.

In operation 604, a determination of whether a sufficient match has been made is rendered. For example, if a comparison result determines that a similarity between facial features of the captured image and the reference image has a match rate equal to or greater than a predetermined threshold, then a sufficient match is determined to have been made and the method proceeds to operation 605 for determining whether the stored reference facial image is to be updated. If the comparison result determines that the similarity between the facial features of the captured image and the reference image has a match rather lower than the predetermined threshold, then insufficient match is determined to have been made and the method proceeds to operation 607 for terminating the method.

In an example, the predetermined rate may be a percentage rate and may be adjusted according to a requested transaction. For example, for making a deposit, the predetermined threshold may be adjusted to be lower. Contrastingly, if the requested transaction is to withdraw an amount of money that is greater than a specific amount, then the predetermined threshold may be adjusted to be higher. Further, if the requested sum to be withdrawn is the daily maximum limit, then the predetermined threshold may be set to a high level. Alternatively, however, for certain transactions, additional biometric authentication may be performed as a matter of course.

In operation 605, a check is made to determine whether the stored reference facial image is older than a predetermined threshold. For example, if the predetermined threshold is 2 years, a check will be made whether the stored reference facial image is older than 2 years. The reference facial image maybe date stamped, for determining an age of the reference facial image. Alternatively, the reference facial image may have a validity period, which may indicate the reference facial image as being expired. Further, the server may delete the reference facial image once it is determined to have been expired.

If the stored reference facial image is determined to be older than the threshold, the reference facial image is updated with the captured facial image to be used as the reference facial image in operation 606. The server may further stored the updated date of the reference facial image and/or an expiration date of the updated reference facial image. The reference facial image may also be programmed to be deleted upon expiration of the reference facial image.

If the stored reference facial image is not determined to be older than the threshold, the method terminates in operation 607.

Figure 7:
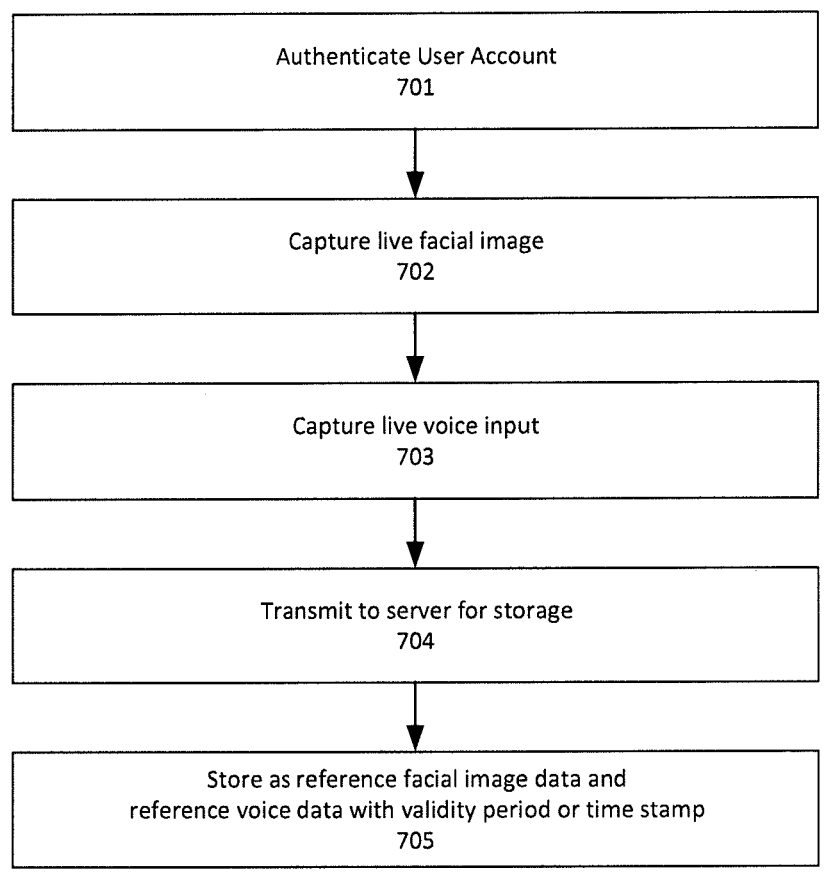
FIG. 7 shows an exemplary method for uploading reference user biometric data, according to an aspect of the present disclosure.

FIG. 7 shows an exemplary method for uploading reference user biometric data, according to an aspect of the present disclosure.

In operation 701, user account of a user may be authenticated via various methods. For example, a banking account of the user may be authenticated on a mobile terminal. The banking account may be authenticated via biometric information, such as finger print or facial image saved on the respective mobile terminal. The finger print or the facial image saved for the mobile terminal may be saved specifically for the mobile terminal, such that the inputted finger print or the facial image captured via the mobile terminal is compared with the finger print or the facial image saved for the mobile terminal. The banking account may be authenticated using biometric information alone, in combination with other authentication information (e.g., user name, password, personal identification number (PIN) and the like), or with the other identification information by itself.

In operation 702, upon authentication of the user account on the mobile terminal, a camera of the mobile terminal may be activated to capture a facial image of the user. Further, the camera of the mobile terminal may be set to capture the facial image of the user in real-time. The camera may be configured to capture the facial image in accordance to a particular setting. For example, the camera may be configured to capture a two-dimensional facial image of the user, which may require less data than a three-dimensional facial image. Unlike a device specific stored facial image for utilizing facial recognition, which may store a single facial image of the user, a server to store the captured facial image stores multiple facial images for multiple users. In view of such purpose, the facial image to be stored in the server for authentication of a user among a large number of users may be configured for quicker identification and verification of users based on the captured image.

In operation 703, upon authentication of the user account on the mobile terminal, a microphone of the mobile terminal may be activated to capture a voice input of the user in real-time. The microphone may be configured to capture the voice of the user in accordance to a particular setting. For example, the mobile terminal may direct the user to speak in a calm voice, a specific phrase, or for a specific duration. Upon capturing of the voice input, the voice input may be analyzed to determine a voice code or print of the user for identifying and/or authenticating the user. Further, unlike a device specific stored voice code for utilizing voice recognition, which may store a single voice code of the user, a server to store the captured voice input stores multiple voice codes for multiple users. In view of such purpose, the voice code to be stored in the server for authentication of a user among a large number of users may be configured for quicker identification and verification of users based on the captured voice code.

In operation 704, the facial image and the voice code are transmitted to a server over a communication network. In an example, the facial image and/or the voice code may be processed before or after transmission to the server. The facial image may be processed to identify a facial pattern of the user in the mobile terminal prior to transmission to the server or be processed at the server. Similarly, the voice input of the user may be processed at the mobile terminal to identify a voice code of the user prior to transmission to the server or be processed at the server.

The server may represent a network of servers residing on a cloud network. In an example, the server may be a closed-network server that may be accessible only by members of a particular organization. In another example, the server may be an open-network server, such as a government database, that may be accessible by various members of the public. Further, the server may serve as a repository of biometric information for various users to upload into for later authentication.

The communication network may include a wired network or a wireless network. Further, the communication network may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

In operation 705, the sever stores the facial image or facial pattern of the user as a reference facial image data. The server also stores the voice input or voice code of the user as a reference voice data. Further, the server may also store date stamp or expiration date or time of the stored reference facial image data and/or the reference voice data. Upon expiration of the stored facial image data and/or the reference voice data, the user may be prompted to provide updated facial image or voice input for storage.

According to aspects of the present disclosure, an automated tell machine (ATM) with improved authentication is provided. More specifically, an identity of a user requesting an ATM transaction may be determined using biometric information, such as facial image and/or voice data. Unlike conventional facial detection devices, such as smart phones, which attempts to match a captured image against a single image stored in the respective device, the ATM will match a captured facial image and/or voice input of the user with among a large number of users of an organization. Further, reference facial image data and/or reference voice data may be stored in an open-sourced database, such that a user may remotely transmit reference facial image data and/or reference voice data for comparison with the image or voice captured at the ATM. The stored reference facial image data and/or reference voice data may be updated at regular time intervals to keep an updated facial and/or voice information of a user, which may be subject to change. The updated facial and/or voice information may also be provided to other organizations (e.g., government agencies) to provide for more accurate authentication information.

In view of the above, a user may be able to conduct an ATM transaction with or without use of traditional debit cards, which may be simply be protected by a four digit personal identification number. Accordingly, in view of the above, a more secure and convenient ATM may be utilized.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As described above, according to an aspect of the present disclosure, an automated teller machine and a corresponding automated teller machine management computing apparatus are provided for providing a more technologically secure and convenient form of authentication for conducting a transaction at the automated teller machine.

As described above, according to an aspects of the present disclosure, an automated teller machine for providing a more secure authentication is provided. The automated teller machine includes a camera, a processor, a communication interface, a user interface, and a cash dispenser. The camera is configured to capture a facial image of a user. The processor is configured to map the captured facial image, extract feature points of the user, and determine a face print of the user. The communication interface is configured to transmit, to a server over a communication network, the face print of the user. Further, the communication interface is further configured to receive, from the server, an identification result from of the user, and a comparison result between the transmitted face print of the user and reference facial image data. The user interface is configured to receive a transaction request, and display an image. The cash dispenser is configured to dispense cash in accordance with the transaction request and authentication result. When the processor determines that the comparison result is at or above a predetermined threshold, the processor authenticates the user and controls the cash dispenser to dispense cash to the user.

According to another aspect of the present disclosure, the ATM further includes a microphone configured to acquire a voice input of the user. The processor analyze the voice input of the user and extract acoustic characteristics of the voice input, and determine a voice print of the user. Also, the communication interface is further configured to receive a request, from the server, for additional authentication information, and transmit, to the server, the voice print of the user in respect to the received request.

According to another aspect of the present disclosure, the additional authentication information is requested when the comparison is below the predetermined threshold.

According to another aspect of the present disclosure, the processor determines that a match between the captured facial image and the reference facial image data is below the predetermined threshold, the processor controls the microphone to prompt the user to provide a voice input.

According to another aspect of the present disclosure, the microphone is further configured to determine whether the extracted acoustic characteristics of the voice input to determine a stress level of the user. Also, when the stress level is determined to be at or above a predetermined threshold, the processor denies the transaction request of the user.

According to another aspect of the present disclosure, when the stress level is determined to be at or above the predetermined threshold, the communication interface transmits an alert notification to an authority organization.

According to another aspect of the present disclosure, the microphone is further configured to determine whether the extracted acoustic characteristics of the voice input to determine a stress level of the user. Also, when the stress level is determined to be below a predetermined threshold, the processor approves the transaction request of the user.

According to another aspect of the present disclosure, the ATM further includes a sensor configured to detect a motion of the user, and to transmit a signal to the camera to activate the camera to capture the facial image of the user.

According to another aspect of the present disclosure, the ATM further includes a sensor configured a sensor configured to detect body heat of the user, and to determine whether the body heat is at or above a predetermined threshold. Further, the processor determines that the user is under stress when the body heat is determined to be above the predetermined threshold.

According to another aspect of the present disclosure, the ATM further includes a sensor configured a speaker configured to output a sound, and to output an alarm when a stress level of the user is detected to be higher than a predetermined threshold.

According to another aspect of the present disclosure, the camera is further configured to detect a stress level of the user based on a facial expression on the captured facial image.

According to another aspect of the present disclosure, the captured facial image of the user is a two-dimensional image.

According to another aspect of the present disclosure, the ATM further includes an iris scanner configured to acquire an image of an iris of the user. Further, the processor determines that a match between the captured facial image and the reference facial image data is below the predetermined threshold, the processor controls the iris scanner to acquire the iris image of the user.

According to another aspect of the present disclosure, the processor is further configured to extract an iris image of the user from the captured facial image, and analyze the iris image to determine an iris code of the user.

As described above, according to an aspects of the present disclosure, a system for providing a more secure authentication at an automated teller machine is provided. The system includes an automated teller machine including a camera, a processor, and a communication interface, and a server including a processor and a memory. The ATM is configured to capture, by the camera, a facial image of a user, map the captured facial image, extract feature points of the facial image, determine a face print of the user, and transmit, to a server over a communication network, the face print of the user. The server is configured to receive, from the ATM over the communication network, the face print of the user, determine an identity of the user based on the face print of the user, and compare a similarity between the face print of the user with reference facial image data, and transmit, to the ATM over the communication network, a comparison result between the face print of the user and the reference facial image data. the ATM, upon receiving the comparison result, determines that the comparison result is at or above a predetermined threshold or not, and when the ATM determines that the comparison result is at or above the predetermine threshold, the ATM authenticates the user and dispense cash to the user.

According to another aspect of the present disclosure, when the server determines that the comparison result is at or above the predetermined threshold, the server checks a validity period of the reference facial image data. Further, when the validity period of the reference facial image data is determined to have passed, updating the received face print to be new reference facial image data and storing, in the memory of the server, the new reference facial image data.

According to another aspect of the present disclosure, the system further includes a mobile terminal including a camera, a processor, a memory, a microphone and a transmitter. The mobile terminal is configured to authenticate the user, capture, by the camera of the mobile terminal, a facial image of the user after authentication of the user, and transmit, by the transmitter, the facial image of the user captured by the camera of the mobile terminal for storage in the server as the reference facial image data.

According to another aspect of the present disclosure, the mobile terminal is further configured to capture, by the microphone of the mobile terminal, a voice input of the user after authentication of the user. Also, the mobile terminal is further configured to transmit, by the transmitter, the voice input of the user captured by the microphone of the mobile terminal for storage in the server as the reference voice data.

According to another aspect of the present disclosure, the server stores the facial image received from the mobile terminal as the reference facial image data and sets a validity period for the facial image received. Further, the sever stores the voice input received from the mobile terminal as the reference voice data and sets a validity period for the voice input received.

As described above, according to an aspects of the present disclosure, a method for providing a more secure authentication at an automated teller machine is provided. The method includes capturing, using a camera of the automated teller machine, a facial image of a user; mapping, by a processor, a facial image of the user; extracting, by the processor, feature points of the facial image; determining, by the processor, a face print of the user; determining, by the processor, an identity of the user based on the face print; comparing, by the processor, a level of similarity between the face print of the user with reference facial image data; determining, by the processor, whether the level of similarity is at or above a predetermined threshold or not; authenticating, by the processor, the user as a valid user when the level of similarity is at or above the predetermined threshold; and dispensing, by a cash dispenser of the ATM, cash in accordance with a requested transaction by the user.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person ordinarily skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An automated teller machine (ATM), comprising:
a camera configured to capture a facial image of a user at varying quality levels;
a processor configured to
map the captured facial image,
extract feature points of the facial image, and
determine a face print of the user;
a communication interface configured to
transmit, to a server over a communication network, the face print of the user, and
receive, from the server, an identification result from of the user, and a comparison result between the transmitted face print of the user and reference facial image data;
a user interface configured to receive a transaction request, and display an image; and
a cash dispenser configured to dispense cash in accordance with the transaction request and authentication result,
wherein a quality level of the facial image to be captured by the camera is adjusted prior to performing capturing of the facial image and according to the transaction request received at the user interface,
wherein, when the processor determines that the comparison result is at or above a predetermined threshold, the processor authenticates the user without using a debit card and controls the cash dispenser to dispense cash to the user, and
wherein the camera is further configured to detect a distance of another person from the user, and capture video data and the processor causes the cash dispenser to deny dispensing of the cash when the other person is detected to be within a predetermined distance range of the user.

2. The ATM of claim 1, further comprising:
a microphone configured to acquire a voice input of the user,
wherein the processor is further configured to analyze the voice input of the user, extract acoustic characteristics of the voice input, and determine a voice print of the user, and
wherein the communication interface is further configured to receive a request, from the server, for additional authentication information, and transmit, to the server, the voice print of the user in respect to the received request.

3. The ATM of claim 2, wherein
the additional authentication information is requested when the comparison result is below the predetermined threshold.

4. The ATM of claim 2, wherein
the processor determines that a match between the captured facial image and the reference facial image data is below the predetermined threshold, the processor controls the microphone to prompt the user to provide the voice input.

5. The ATM of claim 2,
wherein the microphone is further configured to determine whether the extracted acoustic characteristics of the voice input includes a stress level of the user, and wherein, when the stress level is determined to be at or above a predetermined threshold, the processor denies the transaction request of the user.

6. The ATM of claim 5, wherein, when the stress level is determined to be at or above the predetermined threshold, the communication interface transmits an alert notification to an authority organization.

7. The ATM of claim 2, wherein the microphone is further configured to determine whether the extracted acoustic characteristics of the voice input includes a stress level of the user, and wherein, when the stress level is determined to be below a predetermined threshold, the processor approves the transaction request of the user.

8. The ATM of claim 1, further comprising:
a sensor configured to detect a motion of the user, and to transmit a trigger signal to the camera to activate the camera to capture the facial image of the user.

9. The ATM of claim 1, further comprising:
a sensor configured to detect body heat of the user, and to determine whether the body heat is at or above a predetermined threshold, wherein
the processor determines that the user is under stress when the body heat is determined to be above the predetermined threshold.

10. The ATM of claim 1, further comprising:
a speaker configured to output a sound, and to output an alarm when a stress level of the user is detected to be higher than a predetermined threshold.

11. The ATM of claim 1, wherein
the camera is further configured to detect a stress level of the user based on a facial expression on the captured facial image, and capture the video data when the detected stress level is at or above a predetermined threshold.

12. The ATM of claim 1, wherein
the captured facial image of the user is a two-dimensional image.

13. The ATM of claim 1, further comprising:
an iris scanner configured to acquire an iris image of the user,
wherein the processor determines that a match between the captured facial image and the reference facial image data is below the predetermined threshold, the processor controls the iris scanner to acquire the iris image of the user, and
wherein the communication interface transmits, to the server, the iris image for comparison with a reference iris code.

14. The ATM of claim 1,
wherein the processor is further configured to:
extract an iris image of the user from the captured facial image, and
analyze the iris image to determine an iris code of the user, and
wherein the communication interface transmits, to the server, the iris image for comparison with a reference iris code.

15. A system, comprising:
an automated teller machine (ATM) including a camera, a processor, and a communication interface, the ATM configured to:
receive, via a user interface, a transaction request,
capture, by the camera, a facial image of a user at varying quality levels,
map the captured facial image,
extract feature points of the facial image,
determine a face print of the user, and
transmit, to a server over a communication network, the face print of the user; and
a server including a processor and a memory, the server configured to:
receive, from the ATM over the communication network, the face print of the user,
determine an identity of the user based on the face print of the user, and
compare a similarity between the face print of the user with reference facial image data, and
transmit, to the ATM over the communication network, a comparison result between the face print of the user and the reference facial image data,
wherein a quality level of the facial image to be captured by the camera is adjusted prior to performing capturing of the facial image and according to the transaction request received at the user interface,
wherein the ATM, upon receiving the comparison result, determines that the comparison result is at or above a predetermined threshold or not, and when the ATM determines that the comparison result is at or above the predetermine threshold, the ATM authenticates the user without using a debit card and dispense cash to the user, and
wherein the ATM is further configured to detect a distance of another person from the user, and capture video data and deny dispensing of the cash when the other person is detected to be within a predetermined distance range of the user.

16. The system of claim 15,
wherein, when the server determines that the comparison result is at or above the predetermined threshold, the server checks a validity period of the reference facial image data, and
wherein, when the validity period of the reference facial image data is determined to have passed, updating the received face print to be new reference facial image data and storing, in the memory of the server, the new reference facial image data.

17. The system of claim 15, further comprising:
a mobile terminal including a camera, a processor, a memory, a microphone and a transmitter, the mobile terminal configured to:
authenticate the user;
capture, by the camera of the mobile terminal, a facial image of the user after authentication of the user; and
transmit, by the transmitter of the mobile terminal, the facial image of the user captured by the camera of the mobile terminal for storage in the server as the reference facial image data.

18. The system of claim 17,
wherein the mobile terminal is further configured to:
capture, by the microphone of the mobile terminal, a voice input of the user after authentication of the user; and
transmit, by the transmitter, the voice input of the user captured by the microphone of the mobile terminal for storage in the server as the reference voice data.

19. The system of claim 18,
wherein the server stores the facial image received from the mobile terminal as the reference facial image data and sets a validity period for the facial image received, and wherein the sever stores the voice input received from the mobile terminal as the reference voice data and sets a validity period for the voice input received.

20. A method for authenticating a user using an automated teller machine (ATM), the method comprising:
receiving, via a user interface, a transaction request;
capturing, using a camera of the ATM, a facial image of a user at varying quality levels;
mapping, by a processor, a facial image of the user;
extracting, by the processor, feature points of the facial image;
determining, by the processor, a face print of the user;
determining, by the processor, an identity of the user based on the face print;
comparing, by the processor, a level of similarity between the face print of the user with reference facial image data;
determining, by the processor, whether the level of similarity is at or above a predetermined threshold or not;
authenticating, by the processor, the user as a valid user without using a debit card when the level of similarity is at or above the predetermined threshold;
detecting, by the camera, a distance of another person from the user;
dispensing, by a cash dispenser of the ATM, cash in accordance with a requested transaction by the user when the user is authenticated as the valid user and the other person is not detected or is not within the predetermined distance range of the user; and
capturing, by the camera, video data and denying, by the cash dispenser, dispensing of the cash when the other person is detected to be within a predetermined distance range of the user,
wherein a quality level of the facial image to be captured by the camera is adjusted prior to performing capturing of the facial image and according to the transaction request received at the user interface.

* * * * *